United States Patent [19]

Ratliff

[11] 4,236,747
[45] Dec. 2, 1980

[54] TRANSPORT VEHICLE

[76] Inventor: Roger D. Ratliff, 883 S. Irving Heights, Irving, Tex. 75060

[21] Appl. No.: 960,019

[22] Filed: Nov. 13, 1978
(Under 37 CFR 1.47)

[51] Int. Cl.³ .............................................. B60R 7/00
[52] U.S. Cl. ................................. 296/24 R; 296/181
[58] Field of Search .............. 296/24 R, 25, 181, 183, 296/193–198, 203–205; 105/366 R, 366 C, 375, 376

[56] References Cited

U.S. PATENT DOCUMENTS

| | | | |
|---|---|---|---|
| 2,820,667 | 1/1958 | Benaroya | 296/24 R |
| 3,057,489 | 10/1962 | Gilliam, Jr. | 296/183 |
| 3,135,544 | 6/1964 | Mickey et al. | 296/24 R |
| 3,324,595 | 6/1967 | Loomis | 105/376 |
| 3,929,371 | 12/1975 | Gibson | 296/24 R |
| 4,043,569 | 8/1977 | Ratliff | 296/181 |

*Primary Examiner*—Robert R. Song
*Attorney, Agent, or Firm*—Scully, Scott, Murphy & Presser

[57] ABSTRACT

A transport vehicle providing a lightweight and flexible design for a medium-sized route delivery truck. The vehicle is constructed on a conventional truck chassis, and includes a plurality of cargo bays extending transversely across its width, with each cargo bay being dividable into left and right lateral half portions via a removable central panel. In at least one bay the floor in each lateral half is positionable either horizontally or slightly inclined towards the center of the truck, with the proper position being dependent upon the type of merchandise being transported in the cargo bay. The truck frame includes a pair of I beams extending longitudinally from front to rear thereof along the truck roof on top of all of the cargo bays. The pair of I beams extend in a cantilever fashion over the most rearward cargo bay, and provide the load-carrying capacity for that rearward bay by suspending the weight thereof from the pair of I beams. The vehicle design provides an exceptionally versatile delivery truck, with the removability of the central partition in each cargo bay and the adjustability of the position of the floor allowing substantial versatility as to the type of cargo capable of being carried therein. The design provides the potential of being changed on a daily basis to accommodate different types of cargo loads.

13 Claims, 8 Drawing Figures

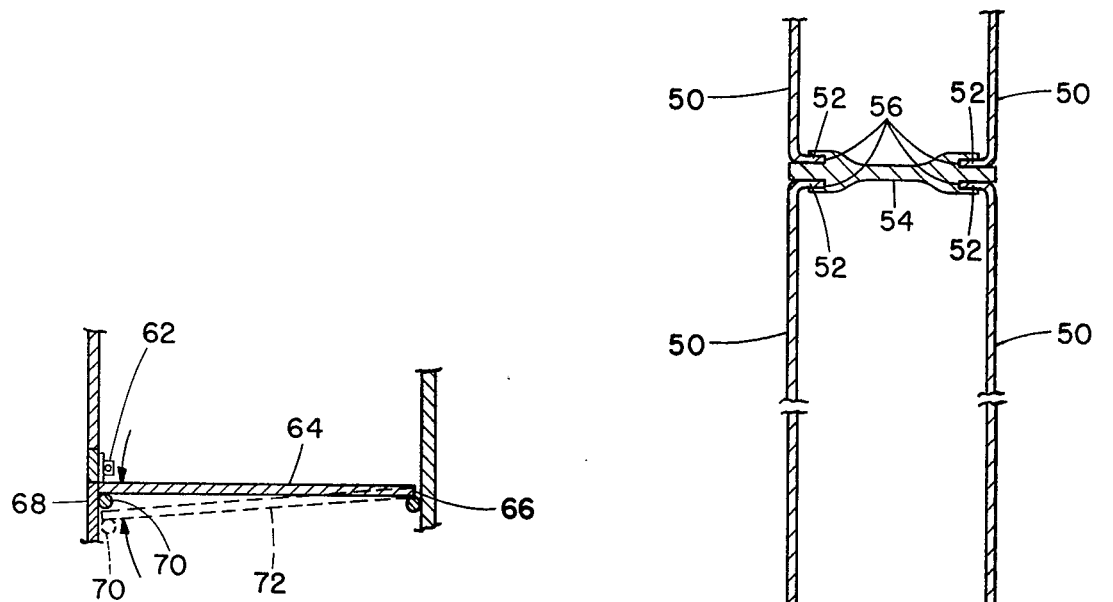
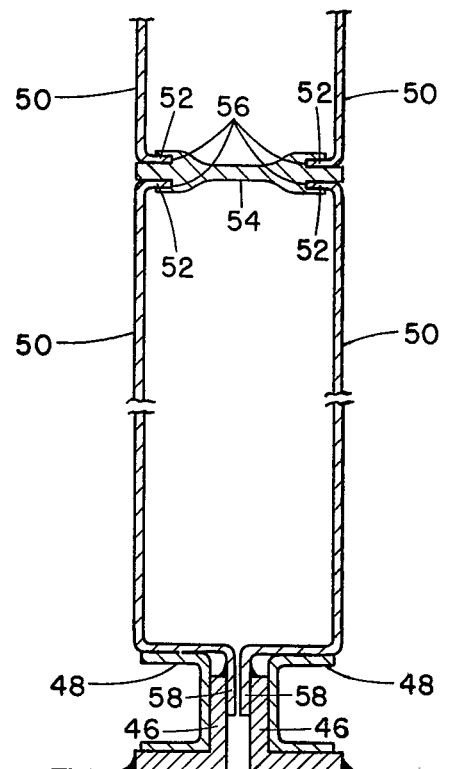
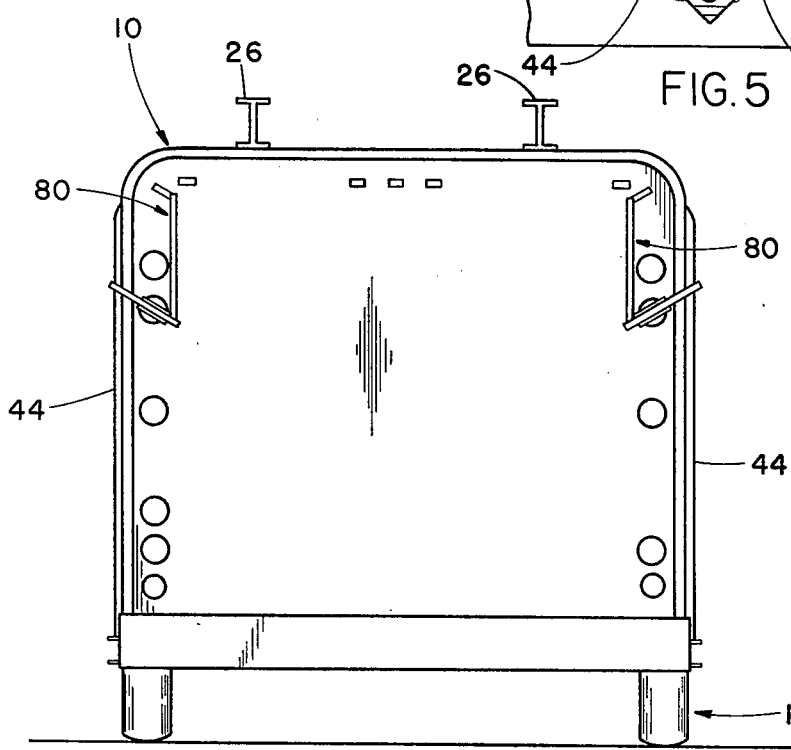
FIG. 3
FIG. 5
FIG. 6

TRANSPORT VEHICLE

BACKGROUND OF THE INVENTION

1. Field of the Invention

The present invention relates in general to transport vehicles, and more particularly pertains to a delivery truck which is extremely versatile as to its load carrying capabilities. In greater detail, the present invention relates to a transportation vehicle having the capability of converting its cargo bays from a design suitable for the transportion of a first type of cargo to an arrangement suitable for the transportation of a second type of cargo.

2. Discussion of the Prior Art

Heretofore many delivery routes have been serviced by trucks which are not entirely suitable for the type of cargo being conveyed, or which do not have the versatility to enable the cargo bays thereof to be adapted to several different types of merchandise. The transportation requirements for delivery runs for beverage bottles, beer kegs, or for full service vending routes or low volume country routes have been served by either small vans or conventional route trucks. In general these vehicles do not offer the versatility which is desirable for a delivery truck serving these types of accounts.

The soft drink industry in particular is a case in point in which the transportation of cases of packaged or crated goods such as soft drinks necessitates the requirements of maintaining different types of trucks which are capable of carrying different types of bulky and heavy loads. It would be desirable to provide a simplified truck body design and frame structure which enables the conveyance of different types of bulk goods through the intermediary of a vehicle providing a light and simple structural frame design. Furthermore, the design should be of a nature to offer a maximum amount of versatility for the conversion of the truck to different types of cargo-carrying arrangements for different types of merchandise, with the special requirements of each different type of cargo being provided for in the design.

Ratliff U.S. Pat. No. 4,043,569 discloses a transportation trailer having an integrally joined frame wherein loads transported by the vehicle are supported primarily by an upper frame structure running longitudinally along its roof. A trailer of the type disclosed by this patent is adapted to be coupled to a tractor or truck cab during transportation of merchandise. Although the structural design of the disclosed vehicle is similar in nature in some respects to that of the present invention, the trailer type of vehicle disclosed therein is not at all suitable to fill the transportation requirements served by a vehicle of the type provided by present invention.

Ratliff U.S. Pat. No. 4,099,764 is also of interest in disclosing a transport truck suitable for the delivery of various types of commercial goods wherein the vehicle has overhead doors positioned along each side thereof, with each overhead door providing access to a cargo bay. More particularly, this patented arrangement provides a unique locking system for the bay doors wherein operatively interconnected levers are manually manipulated to fully close and lock all of the doors along one side of the vehicle. Although the locking arrangement disclosed by this patent is similar in nature to that utilized by the present invention, the transport vehicle of the present invention provides a versatile design suitable for the delivery of different types of cargo which is not disclosed or suggested by this patent.

SUMMARY OF THE INVENTION

Accordingly, an object of the present invention is to provide an improved transport truck offering a great deal of versatility in terms of its capability of delivering different types of cargo. Low volume, small account routes such as for the delivery of beverage bottles, keg beer, or for full service vending routes or low volume country routes are often serviced by either small vans or conventional route trucks. Neither of these vehicles provides the versatility, maneuverability and economy of operation which is desirable in a transportation vehicle to fulfill all of the requirements for these routes. In view thereof, it is an object of the present invention to provide a versatile vehicle which is particularly well-suited for low volume, small account routes of the type mentioned above.

It is also an object of the present invention to provide a transportation vehicle of the type indicated which is easy to drive, park, and maneuver, and which offers a flexible design in which the cargo bays are suited for the transportation of different types of goods, depending upon the particular delivery requirements for that day. Another object of the present invention is to provide a vehicle of the type indicated which has a low initial construction cost and which provides relatively low maintenance costs and superior fuel economy. It is also desirable to have a transportation vehicle of the type described which can be constructed on a standard, commercially available truck chassis.

Accordingly, the present invention contemplates the provision of an improved and unique transport vehicle in which the cargo-carrying area of the truck is divided into a plurality of laterally extending cargo bays, with each cargo bay having the capability of carrying different types of cargo. More particularly, each cargo bay includes a removable center partition, whereby the bay may be divided into left and right cargo bay sections. Furthermore, the floor of each of the left and right sections of the bay may be separately adjustable between a horizontal position, suitable for carrying products disposed in delivery racks, and a second position in which the central portion of the floor is depressed relative to the remainder thereof, with this configuration being particularly suitable for types of goods which are vertically stacked, as on pallets, with the floor providing an inward tilt for the vertically stacked pallets to assist in preventing a vertical stack from accidentially being toppled, as by an uneven road surface.

Furthermore, the present invention contemplates a transport vehicle of the type described including a plurality of structural beams extending longitudinally along the length of the vehicle roof, and extending in cantilever fashion over the rearwardmost cargo bay, and wherein the beams structurally support the weight of that cargo bay and also the cargo therein. Further, the truck has roll-down doors positioned on each side of at least one of the cargo bays therein, and the removable partition is supported in place in the cargo bay by a plurality of longitudinally-extending pins which extend into the forward and rear walls of the bay. In greater particularity, the floor panel on each side of the partition may be pivoted about its longitudinal external side, with the inner longitudinal side of the panel being vertically adjustable by pins on the floor panel and extending into the forward and rearward walls of the cargo bay.

Furthermore, in some embodiments of the invention a removable case rack is positioned in at least one of said cargo bays for supporting merchandise being transported in the vehicle. Also in accordance with a preferred embodiment of the invention, the transport vehicle has three cargo bays arranged along its length, with the central bay being positioned over the vehicular rear wheels.

Accordingly, a primary object of the present invention lies in the provision of a transport vehicle which is extremely flexible and adaptable as to the types of cargo capable of being carried thereby.

BRIEF DESCRIPTION OF THE DRAWINGS

The foregoing and other objects and advantages of a novel transportation vehicle constructed pursuant to the teachings of the present invention may be readily understood by one skilled in the art, with reference being made to the following detailed description of a preferred embodiment thereof, taken in conjunction with the accompanying drawings wherein identical reference numerals are used to refer to like elements throughout the several views, and in which:

FIG. 3 is a sectional view taken along line 3—3 of FIG. 1, illustrating the two possible positions of the floor panel in the forward left cargo bay of the vehicle;

FIG. 5 is a sectional, broken-away view of a vertical exterior frame member and also an interior panel extending transversely across the width of the vehicle, and illustrates further details on the construction of those elements;

FIG. 6 is a rear view of the truck, and illustrates further details of a locking arrangement for locking the lateral side doors of the truck;

DETAILED DESCRIPTION OF A PREFERRED EMBODIMENT

Figure 1:
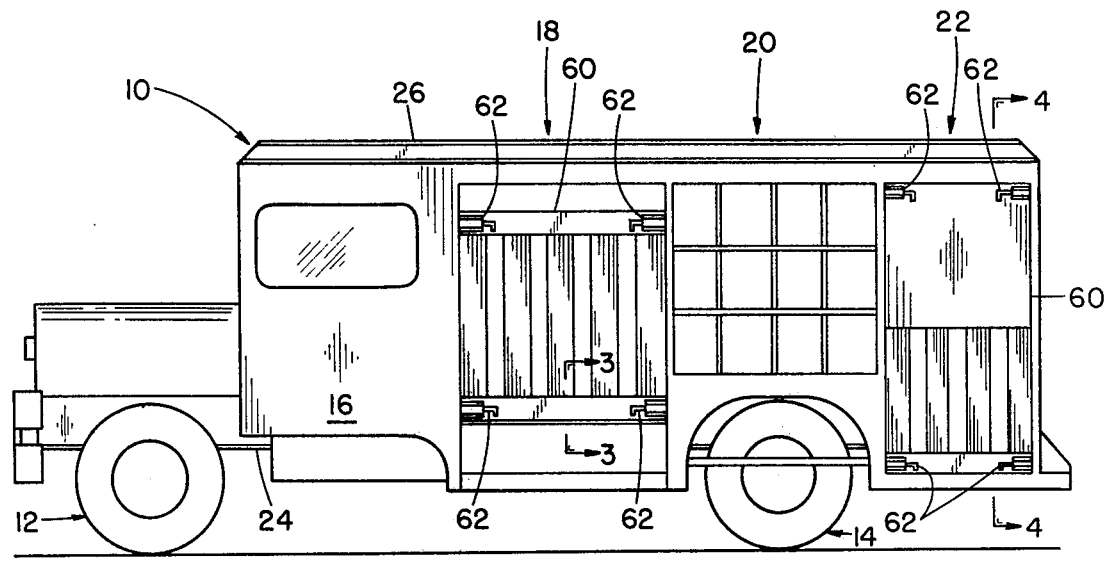
FIG. 1 is a side profile view of the transport vehicle, with the roll-down doors of the cargo bays being open to illustrate the various different cargo-carrying arrangements therein.
Figure 2:
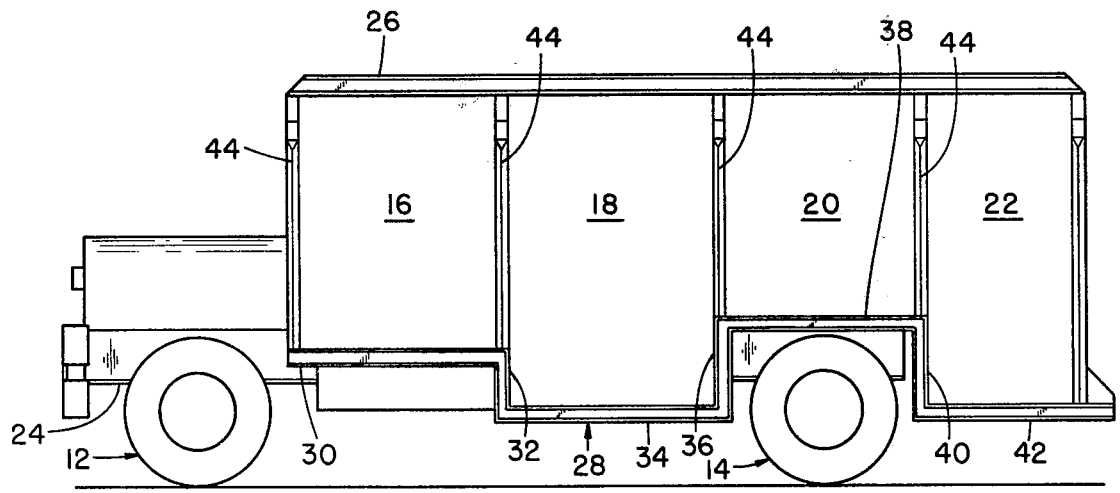
FIG. 2 is a side view of the vehicle, with many of the structural elements omitted, such that the vehicular frame is clearly illustrated.
Figure 7:
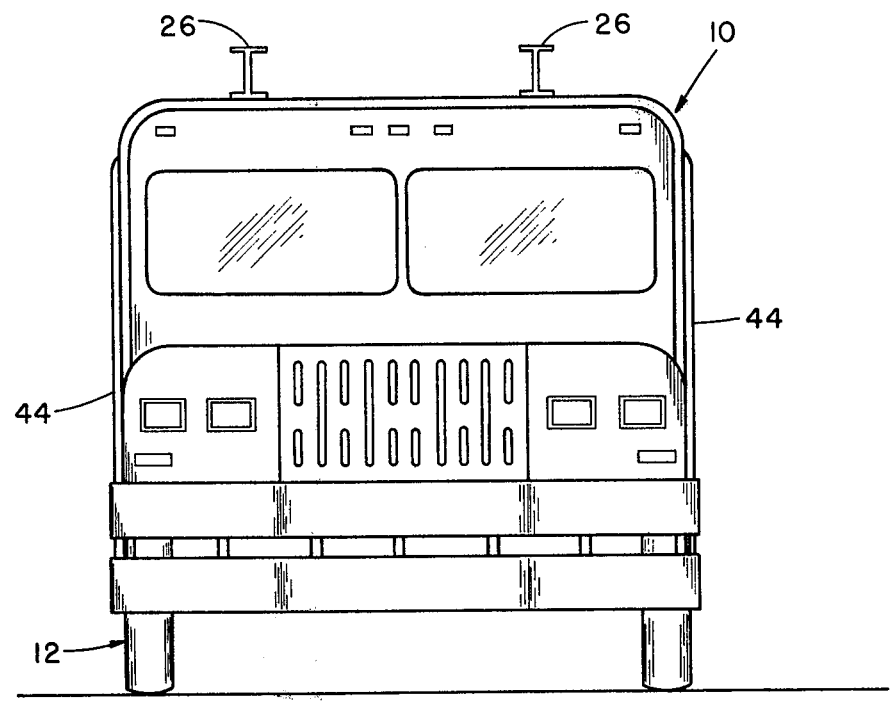
FIG. 7 is a front view of the truck.

Referring now in detail to the drawings, FIG. 1 illustrates a transport vehicle 10 which has forward and rearward sets of wheels 12 and 14. The main body of the transport vehicle includes a forwardly positioned cab section 16 in which a driver and passengers are normally seated, and three transversely positioned cargo receiving bays 18, 20 and 22. The vehicle may be built upon a standard, commercially available small truck type of chassis 24 which extends rearwardly to a location just behind the rear wheels 14, and accordingly the truck chassis 24 does not extend under the rearwardmost cargo bay 22. The transport vehicle 10 has a load-supporting frame assembly comprising an upper frame structure, including two I beams 26, which is integrally fastened to a lower frame structure 28, illustrated most clearly in FIG. 2. The pair of parallel, spaced I beams 26 extend longitudinally on top of the roof of the vehicle on each side of the center thereof, and extend over all of the cargo bays. The pair of I beams extend in a cantilever fashion over the rearwardmost cargo bay 22, and provide the loadcarrying capacity for that rearward bay by suspending the weight of that bay and its cargo from the pair of I beams 26. The lower frame structure is illustrated best in FIG. 2, and is basically constituted of a number of joined structural elements, such as channels or angle irons, which are profiled to assume the general configuration of the undercarriage of the vehicle. Thus, the lower frame structure may consist of a pair of parallel spaced beams 30 located beneath the cab section of the vehicle, a pair of vertically extending beams 32 at the rear of the cab section, a pair of parallel, horizontally extending beams 34 located behind the cab section, a pair of vertically extending beams 36 positioned vertically to clear the rear wheels 14, a pair of horizontally extending frame sections 38 positioned over the rear wheels, a pair of vertically extending beam members 40 positioned behind the rear wheels, and a pair of horizontally extending rearward frame members 42.

Figure 4:
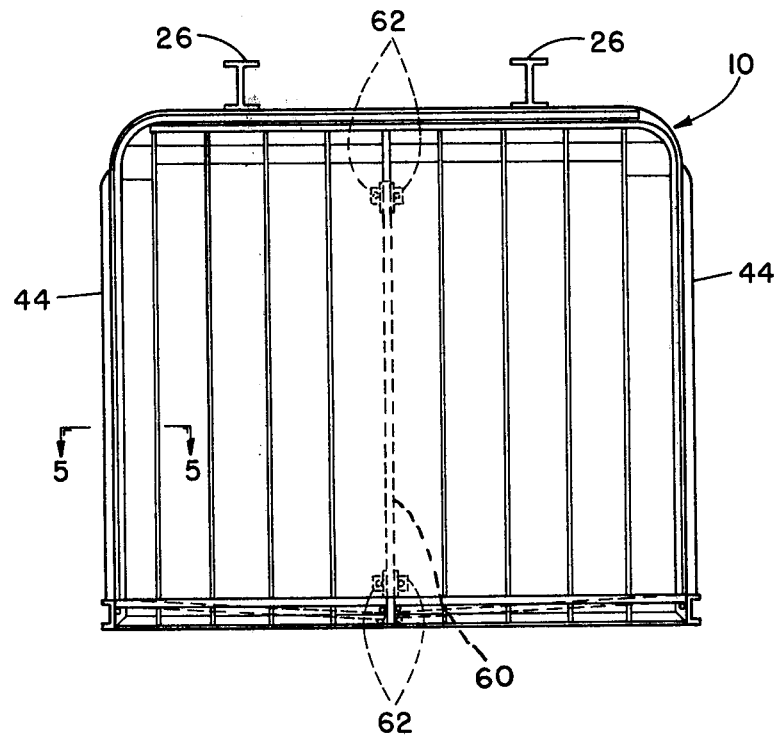
FIG. 4 is a sectional view taken along the line 4—4 of FIG. 1, and illustrates further details of construction of the transport vehicle.

The frame for the vehicle includes a plurality of spaced right angle frame members 44 extending vertically along the sides of the truck body at the front and back thereof and also at positions intermediate the cargo-carrying bays. Each of these right angle frame members 44 extends vertically along the side of the truck body for substantially the height of the vehicle, and then terminates just prior to reaching the full height thereof. As illustrated best in FIG. 5, two right angle frame members 46 are positioned internally of each right angle frame member 44 with a gap between two parallel legs of the members 46, and with each of the other legs of the right angle members 46 parallel to the side wall of the cargo vehicle. Each of the divider partitions between cargo bays includes an inverted U-shaped frame formed by the angle irons 46 and also by two U-shaped channel members 48 extending vertically along an inside wall of the truck and then along the inside of the roof thereof, with one channel member 48 being positioned below the other on the inside of the roof, as illustrated best in FIG. 4. These channel members provide guide or track members on each side of each cargo bay opening for a roll-down door providing access to each bay. The inverted U-shaped structure described thus far provides a frame for a divider partition positioned between each adjacent cargo bay. Essentially, the construction of each divider partition may be in the form of a hollow structure having parallel-spaced panels 50 with internal flanges 52 facing each other. Spacers 54, having a cross-sectional shape as illustrated in FIG. 5, are interposed between the parallel adjacent panels, and have recesses in both sides at each end for engaging the flanges of the panels in cooperative mating relationship. All of the panels and spacers may be suitably spotwelded together to form a rigid, hollow partition structure. In an arrangement of this nature, the angle members 46 on each side of the partition are in a spaced relationship to each other, and have the external edges of the panel interposed therebetween in a relationship as illustrated most clearly by FIG. 5. All of this structure may be suitably interconnected by spot welds or other applicable fasteners.

Each of the cargo-carrying compartments 18, 20 and 22 may include a removable central partition member 60 extending longitudinally through the center of each transversely-extending cargo bay. Each central partition 60 may be secured in place by four spring-biased latches 62 which cooperate with apertures in each of the transversely-extending walls between or at the end of the cargo bays.

Summarizing, the cargo-carrying section of the transport vehicle forming the subject of the present invention may be viewed as three separate transversely-extending cargo bays, each of which is divisible via a longitudinally-extending removable central partition in each of the cargo bays. The floor in the forward cargo bay 18, and in some embodiments also cargo bays 20 and 22, is divided into left and right lateral portions or panels by the central partition. The floor in each lateral half of each cargo bay is positionable either horizontally or slightly inclined toward the center of the truck, with the proper position being dependent upon the type of merchandise being transported in the cargo bay. Each of the floor panels may be positioned in a substantially horizontal position 64, as illustrated in FIG. 3 alternatively it may be pivoted about its longitudinally external side, about pin 66 with the inner longitudinal side of each floor panel being vertically adjustable by pins 70 which extend into the forward and rearward walls of the cargo bay adjacent to the internal wall 68. The floor panel 64 may be positioned horizontally as at position 64 suitable for the placement thereon of a delivery rack 74, of the nature shown in FIG. 8 wherein suitable products are disposed in various portions of the rack. Alternatively the floor panels 64 may be placed in a second position 72 (shown in phantom) in which the central portion of the floor is depressed relative to the external longitudinal edge thereof, with this configuration being particularly suitable for types of goods which are vertically stacked, as on pallets. In this latter position, the floor provides an inward tilt for the vertically stacked goods to assist in preventing the vertical stack from accidentally toppling out of the truck, as by an uneven road surface.

Figure 8:
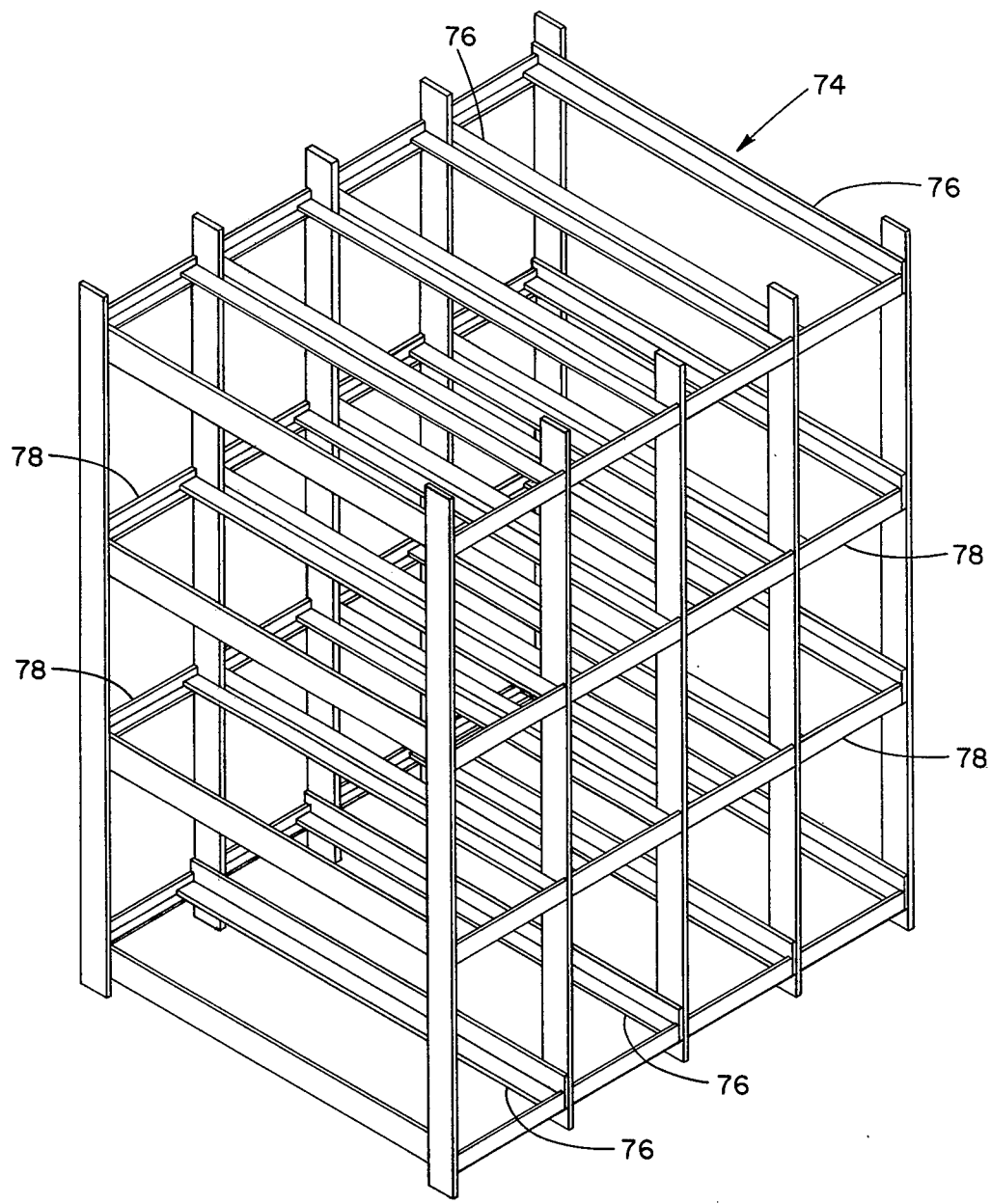
FIG. 8 is a perspective view of a removable case rack, illustrated also in the left middle cargo bay of FIG. 1, and shows details of construction of the rack.

The rack may be of the type sold under the trademark AJUST-O-RACK which may be procured either in an assembled condition or as a kit, and which permits access to cases stored on the rack without undue shuffling thereof, as with mixed pallets of goods. A rack of this nature is constructed of aluminum, and the spacing of tiers may be changed as the mix of package goods on the rack changes. As illustrated in FIG. 8, a rack of this nature is constructed of a number of forward-to-rearward and side-to-side frame members 76 to 78 connected together to form an array of compartments therein.

It is contemplated that the roll-down doors along each side of the transport vehicle may be securely closed and locked in place by a locking mechanism, not illustrated in detail herein, but with the external components 80 thereof illustrated in FIG. 6. A locking mechanism of this nature embodies the principles disclosed in detail in Ratliff U.S. Pat. No. 4,099,764 for OVERHEAD DOOR LOCKING DEVICE.

It should be appreciated that one of the objectives of the present invention is to provide an efficiently operating transport truck, and in view thereof all of the frame and partition members illustrated throughout the drawings of this application are preferably constructed of light-weight aluminum.

While at least one embodiment of the present invention for a transport vehicle has been described in detail, it is readily apparent that many variations on the transport vehicle may be incorporated within the teachings of the present invention. For instance, the number of cargo bays in a vehicle constructed pursuant to the teachings of the present invention may be either less or more than three, the number illustrated in the embodiment herein. Also, one or more of the cargo bays may have the removable, longitudinally-extending central partition therein. Furthermore, one or more of the cargo bays may have a floor divided into panels, the angular positions of which are adjustable to accommodate different types of cargo. Accordingly, it may be appreciated that the teachings of this patent will suggest many alternative and varied embodiments to one of ordinary skill in the art.

What we claim is:

1. A versatile arrangement for a transport vehicle to allow different types of cargo to be carried thereby, comprising:
   (a) a plurality of cargo bays arranged along the length of the vehicle with each cargo bay extending transversely across the width of the vehicle, and at least one cargo bay having a removable centrally located partition member extending along the longitudinal length of the vehicle, and the floor in said bay being divided into first and second floor panels, one on each side of said centrally located partition member, with each floor panel being angularly adjustable to enable the inner central portion of the floor panel to be lowered relative to the remaining portion thereof when the partition member is in place in the cargo bay such that cargo which leans inwardly because of the angularly positioned floor panels can be supported by the central partition member, and when the central partition member is removed the floor panels can be angularly adjusted to provide a level floor surface across the width of the cargo bay, whereby different types of freight can be carried by the vehicle in a versatile manner.

2. A transport vehicle as claimed in claim 1, said vehicle including a plurality of structural beams extending longitudinally along the length of the roof of the vehicle and extending in a cantilever fashion over the rearward most cargo bay, said beams structurally supporting the weight of the rearward most cargo bay and the cargo therein.

3. A transport vehicle as claimed in claim 1, said truck having roll-down doors positioned on each side of at least one cargo bay therein.

4. A transport vehicle as claimed in claim 1, said removable partition being supported in place in the cargo bay by a plurality of longitudinally extending pins, with the pins extending into the forward and rearward walls of the cargo bay.

5. A transport vehicle as claimed in claim 1, with the floor panel on each side of the partition being pivoted about its longitudinally external side, with the inner longitudinal side of each floor panel being vertically adjustable by pins on the floor panel and extending into the forward and rearward walls of the cargo bay.

6. A transport vehicle as claimed in claim 1, including a removable case rack in at least one of said cargo bays for supporting merchandise being transported in the vehicle.

7. A transport vehicle as claimed in claim 1, wherein each of said cargo bays has a removable partition member extending along the longitudinal length of the vehicle, and the floor in each of said bays is divided into panels on each side of said partition member, with each floor panel being angularly adjustable to enable different types of freight to be carried by the vehicle.

8. A transport vehicle as claimed in claim 1, said vehicle having three cargo bays arranged along the length of the vehicle, with the central bay positioned over its rear wheels.

9. A transport vehicle as claimed in claim 8, said vehicle including a plurality of structural beams extending longitudinally along the length of the roof of the vehicle and extending in a cantilever fashion over the rearward most cargo bay, said beams structurally supporting the weight of the rearward most cargo bay and the cargo therein.

10. A transport vehicle as claimed in claim 9, said truck having roll-down doors positioned on each side of the cargo bays therein.

11. A transport vehicle as claimed in claim 10, each removable partition being supported in place in the cargo bay by a plurality of longitudinally extending pins, with the pins extending into the forward and rearward walls of each cargo bay.

12. A transport vehicle as claimed in claim 11, with each floor panel on each side of the partition being pivoted about its longitudinally external side, with the inner longitudinal side of each floor panel being vertically adjustable by pins on the floor panel and extending into the forward and rearward walls of the cargo bay.

13. A transport vehicle as claimed in claim 2, including a removable case rack in at least one of said cargo bays for supporting merchandise being transported in the vehicle.

* * * * *